US010246577B2

(12) United States Patent
Vasseur et al.

(10) Patent No.: US 10,246,577 B2
(45) Date of Patent: Apr. 2, 2019

(54) TIRE PROVIDED WITH A TREAD COMPRISING A RUBBER COMPOSITION INCLUDING A THERMOPLASTIC RESIN OF POLY(METHYL METHACRYLATE)

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Didier Vasseur, Clermont-Ferrand (FR); Frederic Lemerle, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 47 days.

(21) Appl. No.: 15/328,205

(22) PCT Filed: Jul. 9, 2015

(86) PCT No.: PCT/EP2015/065746
§ 371 (c)(1),
(2) Date: Jan. 23, 2017

(87) PCT Pub. No.: WO2016/012256
PCT Pub. Date: Jan. 28, 2016

(65) Prior Publication Data
US 2017/0210887 A1    Jul. 27, 2017

(30) Foreign Application Priority Data

Jul. 24, 2014 (FR) .................................... 14 57133

(51) Int. Cl.
| | |
|---|---|
| *C08L 33/10* | (2006.01) |
| *C08L 7/00* | (2006.01) |
| *B60C 1/00* | (2006.01) |
| *C08K 3/04* | (2006.01) |
| *C08K 3/06* | (2006.01) |
| *C08K 3/22* | (2006.01) |
| *C08K 5/09* | (2006.01) |
| *C08K 5/18* | (2006.01) |
| *C08K 5/47* | (2006.01) |
| *C08L 51/04* | (2006.01) |

(52) U.S. Cl.
CPC .............. *C08L 7/00* (2013.01); *B60C 1/0016* (2013.01); *C08K 3/04* (2013.01); *C08K 3/06* (2013.01); *C08K 3/22* (2013.01); *C08K 5/09* (2013.01); *C08K 5/18* (2013.01); *C08K 5/47* (2013.01); *C08L 33/10* (2013.01); *C08L 51/04* (2013.01); *C08L 2312/00* (2013.01)

(58) Field of Classification Search
CPC ... C08K 3/04; C08K 3/06; C08K 3/22; C08K 3/34; C08K 5/09; C08K 5/18; C08K 5/47; C08L 33/10; C08L 51/04
See application file for complete search history.

(56) References Cited

U.S. PATENT DOCUMENTS

| | | | |
|---|---|---|---|
| 5,115,021 A | 5/1992 | Blythe et al. | 525/84 |
| 5,227,425 A | 7/1993 | Rauline | 524/493 |
| 5,852,099 A | 12/1998 | Vanel | 524/494 |
| 5,900,449 A | 5/1999 | Custodero et al. | 524/430 |
| 5,977,238 A | 11/1999 | Labauze | 524/492 |
| 6,013,718 A | 1/2000 | Cabioch et al. | 524/506 |
| 6,420,488 B1 | 7/2002 | Penot | 525/332.7 |
| 6,503,973 B2 | 1/2003 | Robert et al. | 524/492 |
| 6,536,492 B2 | 3/2003 | Vasseur | 152/450 |
| 6,815,473 B2 | 11/2004 | Robert et al. | 523/215 |
| 7,250,463 B2 | 7/2007 | Durel et al. | 524/492 |
| 7,300,970 B2 | 11/2007 | Durel et al. | 524/493 |
| 7,312,264 B2 | 12/2007 | Gandon-Pain | 524/236 |
| 7,491,767 B2 | 2/2009 | Durel et al. | 524/493 |
| 7,820,771 B2 | 10/2010 | Lapra et al. | 525/479 |
| 8,344,063 B2 | 1/2013 | Marechal et al. | 524/571 |
| 8,461,269 B2 | 6/2013 | Varagniat et al. | 525/209 |
| 8,883,929 B2 | 11/2014 | Gandon-Pain et al. | C08J 3/22 |
| 9,012,541 B2 | 4/2015 | Miyazaki | C08L 9/08 |
| 2001/0034389 A1 | 10/2001 | Vasseur | 524/137 |
| 2001/0036991 A1 | 11/2001 | Robert et al. | 524/492 |
| 2002/0183436 A1 | 12/2002 | Robert et al. | 524/492 |
| 2005/0004297 A1 | 1/2005 | Durel et al. | 524/493 |
| 2005/0016650 A1 | 1/2005 | Durel et al. | 152/209.1 |
| 2005/0016651 A1 | 1/2005 | Durel et al. | 152/209.1 |
| 2006/0089445 A1 | 4/2006 | Gandon-Pain | 524/492 |
| 2008/0132644 A1 | 6/2008 | Lapra et al. | 525/105 |
| 2009/0270558 A1 | 10/2009 | Gandon-Pain et al. | 525/190 |
| 2010/0022714 A1 | 1/2010 | Varagniat et al. | 525/209 |
| 2010/0184912 A1 | 7/2010 | Marechal et al. | 524/571 |
| 2010/0249270 A1 | 9/2010 | Robert et al. | 523/150 |

(Continued)

FOREIGN PATENT DOCUMENTS

| | | |
|---|---|---|
| EP | 0 351 054 A1 | 1/1990 |
| EP | 0 501 227 A1 | 9/1992 |
| EP | 0 735 088 A1 | 10/1996 |
| EP | 0 810 258 A1 | 12/1997 |
| EP | 1 127 909 A1 | 8/2001 |
| EP | 2 457 720 A1 | 5/2012 |
| EP | 2 703 186 A1 | 3/2014 |
| FR | 2 740 778 A1 | 5/1997 |
| FR | 2 765 882 A1 | 1/1999 |
| WO | 97/36724 | 10/1997 |
| WO | 99/16600 | 4/1999 |
| WO | 00/05300 | 2/2000 |
| WO | 00/05301 | 2/2000 |

(Continued)

*Primary Examiner* — Edward J Cain
(74) *Attorney, Agent, or Firm* — Venable LLP

(57) ABSTRACT

A tire is provided with a tread comprising a rubber composition based on at least one diene elastomer, a reinforcing filler, a crosslinking system and a polymethyl methacrylate thermoplastic resin, the polymethyl methacrylate thermoplastic resin exhibiting a Vicat point, measured according to Standard ISO 306: 2013 B50, within a range extending from 60° C. to 100° C.

23 Claims, No Drawings

(56) References Cited

U.S. PATENT DOCUMENTS

| | | | |
|---|---|---|---|
| 2010/0252156 A1 | 10/2010 | Robert et al. | 152/209.1 |
| 2011/0021702 A1 | 1/2011 | Gandon-Pain et al. | 525/55 |
| 2012/0125525 A1 | 5/2012 | Majumdar et al. | 156/123 |
| 2012/0208948 A1 | 8/2012 | Gandon-Pain et al. | 524/521 |
| 2012/0252928 A1 | 10/2012 | Marechal et al. | 523/155 |
| 2014/0066548 A1 | 3/2014 | Miyazaki | 524/43 |
| 2017/0009066 A1* | 1/2017 | Fukunishi | C08L 33/10 |

FOREIGN PATENT DOCUMENTS

| | | |
|---|---|---|
| WO | 01/92402 A1 | 12/2001 |
| WO | 03/002648 A1 | 1/2003 |
| WO | 03/002649 A1 | 1/2003 |
| WO | 03/016387 A1 | 2/2003 |
| WO | 2004/096865 A1 | 11/2004 |
| WO | 2006/069792 A1 | 7/2006 |
| WO | 2006/069793 A1 | 7/2006 |
| WO | 2008/003434 A1 | 1/2008 |
| WO | 2008/003435 A1 | 1/2008 |
| WO | 2008/141702 A1 | 11/2008 |
| WO | 2009/000750 A1 | 12/2008 |
| WO | 2009/000752 A1 | 12/2008 |
| WO | 2011/042507 A1 | 4/2011 |

\* cited by examiner

TIRE PROVIDED WITH A TREAD COMPRISING A RUBBER COMPOSITION INCLUDING A THERMOPLASTIC RESIN OF POLY(METHYL METHACRYLATE)

FIELD OF THE INVENTION

The invention relates to compositions, in particular for tyres, and more particularly to compositions for a tyre tread.

RELATED ART

A tyre tread has to meet, in a known way, a large number of often conflicting technical requirements, including a low rolling resistance, good road behaviour, a high dry grip and a high wet grip.

In this context, many solutions have already been proposed, such as, for example, the use of a natural rubber grafted with polymethyl methacrylate, in order to improve the wet grip and the road behaviour, such as, for example, the compositions described in the document EP 351 054.

Nevertheless, manufacturers are always looking for solutions for improving, at the same time, all the categories of performance of tyre compositions and in particular, in addition to the wet grip and the road behaviour, the rolling resistance.

The Applicant Companies have now shown that specific compositions comprising a specific polymethyl methacrylate thermoplastic resin, without this polymethyl methacrylate being grafted to an elastomer, make it possible to have an improved compromise between numerous categories of performance desired for tyre compositions, that is to say the rolling resistance, the wet grip and the road behaviour.

BRIEF DESCRIPTION OF EMBODIMENTS OF THE INVENTION

The invention thus relates to a tyre provided with a tread comprising a rubber composition based on at least one diene elastomer, a reinforcing filler, a crosslinking system and a polymethyl methacrylate thermoplastic resin, the polymethyl methacrylate thermoplastic resin exhibiting a Vicat point, measured according to Standard ISO 306: 2013 B50, within a range extending from 60° C. to 100° C.

Preferably, the invention relates to a tyre as defined above in which the diene elastomer is selected from the group consisting of polybutadienes, synthetic polyisoprenes, natural rubber, butadiene copolymers, isoprene copolymers and the mixtures of these elastomers. Preferably, the diene elastomer is selected from the group consisting of polybutadienes, copolymers of butadiene and styrene, natural rubber and the mixtures of these elastomers.

Preferably again, the invention relates to a tyre as defined above in which the reinforcing filler is selected from the group consisting of silicas, carbon blacks and the mixtures thereof. Preferably, the content of reinforcing filler is within a range extending from 10 to 200 phr and preferably from 10 to 150 phr.

According to a first preferred embodiment, the invention relates to a tyre as defined above in which the predominant reinforcing filler is carbon black. Preferably, the content of carbon black is within a range extending from 10 to 90 phr and preferably from 10 to 70 phr.

According to a second preferred embodiment which is an alternative to the first embodiment above, the invention relates to a tyre as defined above in which the predominant reinforcing filler is silica. Preferably, the content of silica is within a range extending from 50 to 140 phr and preferably from 70 to 120 phr.

Preferably, the invention relates to a tyre as defined above in which the content of polymethyl methacrylate thermoplastic resin is within a range extending from 1 to 40 phr and preferably from 2 to 35 phr. More preferably, the content of polymethyl methacrylate thermoplastic resin is within a range extending from 3 to 30 phr and preferably from 5 to 15 phr.

Preferably again, the invention relates to a tyre as defined above in which the Vicat softening point of the polymethyl methacrylate thermoplastic resin is within a range extending from 65° C. to 95° C. and preferably from 70° C. to 90° C.

Preferably, the invention relates to a tyre as defined above in which the tread composition additionally comprises a plasticizer. Preferably, the plasticizer is chosen from oils, hydrocarbon resins and the mixtures therof. Preferably, the content of plasticizer is within a range extending from 2 to 80 phr and preferably from 5 to 60 phr.

Alternatively and preferably again, the invention relates to a tyre as defined above in which the tread composition does not comprise another plasticizing agent than the polymethyl methacrylate resin.

Preferably, the tyre according to the invention will be chosen from the tyres intended to equip a two-wheel vehicle, a passenger vehicle, or also a "heavy-duty" vehicle (that is to say, underground, bus, off-road vehicles, heavy road transport vehicles, such as lorries, tractors or trailers), or also aircraft, construction equipment, heavy agricultural vehicles or handling vehicles.

DETAILED DESCRIPTION

I—Constituents of the Composition of Tread of the Tyre of the Invention

The tyre according to the invention is provided with a tread comprising a rubber composition based on at least one diene elastomer, a reinforcing filler, a crosslinking system and a polymethyl methacrylate thermoplastic resin, the polymethyl methacrylate thermoplastic resin exhibiting a Vicat point, measured according to Standard ISO 306: 2013 B50, within a range extending from 60° C. to 100° C.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

In the present description, unless expressly indicated otherwise, all the percentages (%) shown are percentages by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

When reference is made to a "predominant" compound, this is understood to mean, within the meaning of the present invention, that this compound is predominant among the compounds of the same type in the composition, that is to say that it is the one which represents the greatest amount by weight among the compounds of the same type. Thus, for example, a predominant polymer is the polymer representing the greatest weight with respect to the total weight of the polymers in the composition. In the same way, a "predominant" filler is that representing the greatest weight among the fillers of the composition. By way of example, in a system comprising just one polymer, the latter is predominant within the meaning of the present invention and, in a system comprising two polymers, the predominant polymer represents more than half of the weight of the polymers.

On the contrary, a "minor" compound is a compound which does not represent the greatest fraction by weight among the compounds of the same type.

I-1 Diene Elastomer

The compositions can comprise just one diene elastomer or a mixture of several diene elastomers.

It should be remembered here that elastomer (or "rubber", the two terms being regarded as synonymous) of the "diene" type should be understood, in a known way, to mean an (one or more is understood) elastomer resulting at least in part (i.e., a homopolymer or a copolymer) from diene monomers (monomers bearing two conjugated or non-conjugated carbon-carbon double bonds).

The diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, a "highly unsaturated" diene elastomer is understood in particular to mean a diene elastomer having a content of units of diene origin (conjugated dienes) which is greater than 50%.

Given these definitions, diene elastomer capable of being used in the compositions according to the invention is understood more particularly to mean:

(a) any homopolymer obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d) a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the above type (a) or (b).

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type.

These functionalized elastomers can be used as a blend with one another or with non-functionalized elastomers. For example, it is possible to use a silanol- or polysiloxane-functionalized elastomer having a silanol end, as a mixture with an elastomer coupled and/or star-branched with tin (described in WO 11/042507), the latter representing a content of 5% to 50%, for example of 25% to 50%.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and in particular those having an isoprene content of between 5% and 90% by weight and a Tg of −40° C. to −80° C., or isoprene/styrene copolymers and in particular those having a styrene content of between 5% and 50% by weight and a Tg of between −5° C. and −60° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are suitable in particular.

To summarize, the diene elastomer of the composition is preferably selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds.

More preferably, the diene elastomer of the composition is preferably selected from the group of highly unsaturated diene elastomers consisting of polybutadienes (BRs), butadiene/styrene copolymers (SBRs), natural rubber (NR) and the mixtures of these elastomers.

According to a specific embodiment, the composition comprises from 50 to 100 phr of an SBR elastomer, whether an SBR prepared in emulsion ("ESBR") or an SBR prepared in solution ("SSBR").

According to another specific embodiment, the diene elastomer is an SBR/BR blend (mixture).

According to other possible embodiments, the diene elastomer is an SBR/NR (or SBR/IR), BR/NR (or BR/IR) or also SBR/BR/NR (or SBR/BR/IR) blend.

In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

According to a preferred embodiment of the invention, the rubber composition comprises a blend of a (one or more) "high Tg" diene elastomer exhibiting a Tg of between −70° C. and 0° C. and of a (one or more) "low Tg" diene elastomer of between −110° C. and −80° C., more preferably between −105° C. and −90° C. The high Tg elastomer is preferably selected from the group consisting of S-SBRs, E-SBRs, natural rubber, synthetic polyisoprenes (exhibiting a content (mol %) of cis-1,4-enchainments preferably of greater than 95%), BIRs, SIRs, SBIRs and the mixtures of these elastomers. The low Tg elastomer preferably comprises butadiene units according to a content (mol %) at least equal to 70%; it preferably consists of a polybutadiene (BR) exhibiting a content (mol %) of cis-1,4-enchainments of greater than 90%.

According to another specific embodiment of the invention, the rubber composition comprises, for example, between 30 and 90 phr, in particular between 40 and 90 phr, of a high Tg elastomer as a blend with a low Tg elastomer.

According to another specific embodiment of the invention, the diene elastomer of the composition according to the invention comprises a blend of a BR (as low Tg elastomer) exhibiting a content (mol %) of cis-1,4-enchainments of greater than 90% with one or more S-SBRs or E-SBRs (as high Tg elastomer(s)).

Alternatively and according to another preferred embodiment, the rubber composition predominantly comprises natural rubber, and more preferably natural rubber as sole elastomer.

I-2 Reinforcing Filler

The composition according to the invention comprises a reinforcing filler. Use may be made of any type of reinforcing filler known for its abilities to reinforce a rubber composition which can be used for the manufacture of tyres, for example an organic filler, such as carbon black, a reinforcing inorganic filler, such as silica or alumina, or also a blend of these two types of filler.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

The composition can comprise one type of silica or a blend of several silicas. The silica used can be any reinforcing silica known to a person skilled in the art, in particular any precipitated or fumed silica exhibiting a BET specific surface and a CTAB specific surface both of less than 450 m$^2$/g, preferably from 30 to 400 m$^2$/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in Application EP-A-0735088, or the silicas with a high specific surface as described in Application WO 03/16837.

The silica preferably has a BET specific surface of between 45 and 400 m$^2$/g, more preferably of between 60 and 300 m$^2$/g.

These compositions can optionally also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use is made in particular of silane polysulphides, referred to as "symmetrical" or "asymmetrical" depending on their specific structure, such as described, for example, in Applications WO 03/002648 (or US 2005/016651) and WO 03/002649 (or US 2005/016650).

When the composition comprises an inorganic filler, such as silica, the content of coupling agent is preferably between 2 and 15 phr, more preferably between 3 and 13 phr and more preferably still between 5 and 11 phr.

A person skilled in the art will understand that, as filler equivalent to silica described in the present section, use might be made of a reinforcing filler of another nature, in particular organic nature, provided that this reinforcing filler is covered with a layer of silica or else comprises functional sites, in particular hydroxyl sites, at its surface which require the use of a coupling agent in order to form the bond between the filler and the elastomer.

The physical state under which the reinforcing filler is provided is not important, whether it is in the form of a powder, of microbeads, of granules, of beads or any other appropriate densified form.

The fraction by volume of reinforcing filler in the rubber composition is defined as being the ratio of the volume of the reinforcing filler to the volume of all the constituents of the composition, it being understood that the volume of all the constituents is calculated by adding together the volumes of each of the constituents of the composition. The fraction by volume of reinforcing filler in a composition is thus defined as the ratio of the volume of the reinforcing filler to the sum of the volumes of each of the constituents of the composition; typically, this fraction by volume is between 10% and 30% and preferably between 15% and 25%. In an equivalent preferred way, the total content of reinforcing filler (carbon black and/or reinforcing inorganic filler, such as silica) is from 10 to 200 phr, more preferably from 10 to 150 phr and very preferably from 15 to 135 phr. Below 10 phr of filler, the composition might be less effective with regard to wear resistance whereas, above 200 phr of filler, the composition might be less effective with regard to rolling resistance.

According to one embodiment, the composition comprises carbon black as predominant filler, as an optional blend with silica, as minor filler. In this case, the content of black is preferentially within a range extending from 10 to 90 phr and preferably from 10 to 70 phr. The content of silica is preferentially within a range extending from 0 to 45 phr and preferably from 0 to 35 phr. In this embodiment, the content of silica is preferably 0 phr or less than 10 phr.

According to one embodiment, the composition comprises silica as predominant filler, as an optional blend with carbon black, as minor filler. In this case, the content of silica is preferentially within a range extending from 50 to 140 phr and preferably from 70 to 120 phr. The content of black is preferentially within a range extending from 0 to 50 phr and preferably from 1 to 30 phr. In this embodiment, the content of black is preferentially within a range extending from 1 to 5 phr and preferentially of less than or equal to 4 phr.

I-3 Crosslinking System

The crosslinking system can be composed of any crosslinking agent capable of crosslinking or bringing about the crosslinking of the diene elastomer of the composition. Preferably, the crosslinking system comprises sulphur as crosslinking agent; it is thus a vulcanization system.

The vulcanization system proper is based on sulphur (or on a sulphur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

The sulphur is used at a preferred content of between 0.5 and 10 phr, more preferably of between 0.5 and 5 phr, in particular between 0.5 and 3 phr, when the composition of the invention is intended, according to a preferred form of the invention, to constitute a tyre tread.

The vulcanization system of the composition according to the invention can also comprise one or more additional accelerators, for example compounds of the family of the thiurams, zinc dithiocarbamate derivatives, sulphenamides, guanidines or thiophosphates. Use may in particular be made of any compound capable of acting as accelerator for the vulcanization of diene elastomers in the presence of sulphur, in particular accelerators of the thiazole type, and also their derivatives, and accelerators of thiuram and zinc dithiocarbamate type. These accelerators are more preferably selected from the group consisting of 2-mercaptobenzothiazyl disulphide (abbreviated to MBTS), N-cyclohexyl-2-benzothiazolesulphenamide (abbreviated to CBS), N,N-dicyclohexyl-2-benzothiazolesulphenamide (abbreviated to DCBS), N-(tert-butyl)-2-benzothiazolesulphenamide (abbreviated to TBBS), N-(tert-butyl)-2-benzothiazolesulphenimide (abbreviated to TBSI), zinc dibenzyldithiocarbamate (abbreviated to ZBEC) and the mixtures of these compounds. Preferably, use is made of a primary accelerator of the sulphenamide type.

I-4 PMMA Thermoplastic Resin

The rubber composition of the tread of the tyre according to the invention comprises a polymethyl methacrylate (PMMA) resin (that is to say, one or more resins).

The PMMA thermoplastic resin is a polymer essentially (that is to say, to more than 80%, preferably to more than 90% and preferably to more than 95%, for example to 100%) formed from polymerized methyl methacrylate monomers.

For the requirements of the invention, the PMMA thermoplastic resin exhibits a Vicat softening point, measured according to Standard ISO 306: 2013 B50, within a range extending from 60° C. to 100° C. Below 60° C., there is a risk of the resin no longer being sufficiently stiff whereas, above 100° C., the PMMA thermoplastic resin brings about an excessively high stiffness which can reduce the grip performance and increase the hysteresis. For these reasons, it is preferable for the Vicat softening point of the PMMA resin to be within a range extending from 65° C. to 95° C. and preferably within a range from 70° C. to 90° C.

The PMMA resins can be prepared in a way known to a person skilled in the art by radical polymerization of methyl methacrylate and are also available commercially, for example from Asahi Kasei, under the trade name "Delpet SR 6500", with a Vicat softening point of 78° C.

I-5 Other Possible Additives

The rubber compositions of the tread of the tyre in accordance with the invention optionally also comprise all or a portion of the normal additives generally used in elastomer compositions intended in particular for the manufacture of treads, such as, for example, pigments, protective agents, such as antiozone waxes, chemical antiozonants or antioxidants, plasticizing agents other than those described above, anti-fatigue agents, reinforcing resins, or methylene acceptors (for example novolak phenolic resin) or donors (for example HMT or H3M).

The rubber compositions of the tread of the tyre in accordance with the invention also optionally comprise a plasticizer, other than the PMMA resin described above, such as a combination of plasticizers or plasticizing system. This plasticizer or combination of plasticizers can be composed of one or more plasticizing agents known to a person skilled in the art and chosen in particular from plasticizing oils, plasticizing resins and the mixtures of the latter.

Any extending oil, whether it is of aromatic or non-aromatic nature, known for its plasticizing properties with regard to diene elastomers can be used. At ambient temperature (20° C.), these oils, which are more or less viscous, are liquids (that is to say, as a reminder, substances which have the ability to eventually assume the shape of their container), in contrast in particular to plasticizing hydrocarbon resins, which are by nature solids at ambient temperature.

Extending oils selected from the group consisting of naphthenic oils (low or high viscosity, in particular hydrogenated or not), paraffinic oils, MES (Medium Extracted Solvates) oils, TDAE (Treated Distillate Aromatic Extracts) oils, mineral oils, vegetable oils, ether plasticizers, ester plasticizers, phosphate plasticizers, sulphonate plasticizers and the mixtures of these compounds are particularly suitable.

Use may also be made of any thermoplastic hydrocarbon resin known for its ability to plasticize a rubber composition. The thermoplastic hydrocarbon resins can be aliphatic or aromatic or also of the aliphatic/aromatic type, that is to say based on aliphatic and/or aromatic monomers. They can be natural or synthetic and based or not based on petroleum (if such is the case, they are also known under the name of petroleum resins).

Preferably, the content of plasticizer in the compositions of use in the invention is within a range extending from 2 to 80 phr and preferably from 5 to 60 phr.

Alternatively, according to another preferred embodiment, the tread composition according to the invention does not comprise a plasticizer other than the PMMA resin described above.

Of course, the compositions of use to the requirements of the invention can be used alone or as a blend (i.e., as a mixture) with any other rubber composition which can be used for the manufacture of tyres.

II—Preparation of the Tyres of the Invention

The composition of the tread of the tyre according to the invention is manufactured in appropriate mixers, using two successive phases of preparation which are well known to a person skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in Applications EP-A-0 501 227, EP-A-0 735 088, EP-A-0 810 258, WO00/05300 or WO00/05301.

The first (non-productive) phase is preferably carried out in several thermomechanical stages. During a first stage, the elastomers, the reinforcing fillers and the PMMA thermoplastic resin (and optionally the other ingredients, with the exception of the crosslinking system) are introduced into an appropriate mixer, such as an ordinary internal mixer, at a temperature between 20° C. and 100° C. and preferably between 25° C. and 100° C. After a few minutes, preferably from 0.5 to 2 min, and a rise in the temperature to 90° C. or to 100° C., the other ingredients (that is to say, those which remain, if not all were put in at the start) are added all at once or in portions, with the exception of the vulcanization system, during a mixing ranging from 20 seconds to a few minutes. The total duration of the kneading, in this non-productive phase, is preferably between 2 and 10 minutes at a temperature of less than or equal to 180° C. and preferably of less than or equal to 170° C.

After cooling the mixture thus obtained, the crosslinking system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or plaque, in particular for laboratory characterization, or else extruded, in order to form, for example, a rubber profiled element used in the manufacture of a tread. This tread produced is subsequently used in the manufacture of a tyre according to the techniques known to a person skilled in the art.

The vulcanization (or curing) is carried out in a known way at a temperature generally of between 130° C. and 200° C., under pressure, for a sufficient time which can vary, for example, between 5 and 90 min, as a function in particular of the curing temperature, of the crosslinking system adopted, of the kinetics of vulcanization of the composition under consideration or of the size of the tyre.

The examples which follow illustrate the invention without, however, limiting it.

III—Examples of the Implementation of the Invention

III-1 Preparation of the Examples

In the examples which follow, the rubber compositions were produced as described above.

III-2 Characterization of the Examples

In the examples, the rubber compositions are characterized, before and/or after curing, as indicated below.

Dynamic Properties (after Curing):

The dynamic properties G* and tan(δ)max are measured on a viscosity analyser (Metravib V A4000) according to Standard ASTM D 5992-96. The response of a sample of vulcanized composition (cylindrical test specimen with a thickness of 4 mm and a cross-section of 400 mm$^2$), subjected to a simple alternating sinusoidal shear stress, at a frequency of 10 Hz, under variable temperature conditions, in particular at 60° C., according to Standard ASTM D 1349-99, is recorded. A peak-to-peak strain amplitude sweep is carried out from 0.1% to 50% (outward cycle) and then from 50% to 1% (return cycle). The results made use of are the complex dynamic shear modulus (G*) and the loss factor (tan δ). The maximum value of tan δ observed (tan(δ)max) and the difference in complex modulus (ΔG*) between the values at 0.1% and at 50% strain (Payne effect) are shown for the return cycle. The lower the value for the tan(δ) max at 60° C., the lower will be the hysteresis of the composition and thus the lower will be the rolling resistance.

Method for Measuring the Coefficient of Friction (μ)

The measurements of coefficient of dynamic friction were carried out according to a method identical to that described by L. Busse, A. Le Gal and M. Kuppel (Modelling of Dry and Wet Friction of Silica Filled Elastomers on Self-Affine Road Surfaces, Elastomer Friction, 2010, 51, p. 8) on a Brucker UMT3 tribometer. The test specimens are produced by moulding and then crosslinking a rubber support in the shape of a ring with an external diameter of 7 cm, an internal diameter of 6 cm and a thickness of 0.7 cm. After closing the mould, the latter is placed in a press comprising heating platens at the temperature (typically 150° C.) necessary and for the time necessary for the crosslinking of the material (typically several tens of minutes), at a pressure of 16 bar. The surface used to carry out these measurements is a core withdrawn from a real road surface made of bituminous concrete of BBTM type (Standard NF P 98-137). In order to prevent phenomena of dewetting and the appearance of secondary grip forces between the ground and the material, the ground+test specimen system is immersed in a 5% aqueous solution of a surface-active agent (Sinnozon—CAS number: 25155-30-0). The temperature of the aqueous solution is regulated using a thermostatic bath. The test specimen is subjected to a sliding movement in translation parallel to the plane of the ground. The sliding velocity SV is set at 0.9 m/sec. The normal stress applied n is 300 kPa. These conditions are described below by "wet ground conditions". The tangential stress t, opposed to the movement of the test specimen over the ground, is measured continuously. The ratio of the tangential stress t to the normal stress n gives the coefficient of dynamic friction $\mu$. The values indicated in the examples are the coefficient of dynamic friction values measured for an aqueous solution temperature of 20° C., obtained under steady state conditions after stabilization of the value of the tangential stress t. A value greater than that of the reference, arbitrarily fixed at 100, indicates an improved result.

III-3 Examples

The compositions are manufactured with introduction of all of the constituents onto an internal mixer, with the exception of the vulcanization system. The vulcanization agents (sulphur and accelerator) are introduced onto an external mixer at low temperature (the constituent rollers of the mixer being at approximately 30° C.).

The object of the examples presented in Table 1 is to compare the different rubber properties of control compositions (T1 to T7) with compositions C1 to C4 in accordance with the invention. The measurement results for the properties measured, before and after curing, are presented in Table 2.

TABLE 1

|  | Composition | | | | | | | | | | |
| --- | --- | --- | --- | --- | --- | --- | --- | --- | --- | --- | --- |
|  | T1 | T2 | C1 | T3 | T4 | C2 | T5 | C3 | T6 | T7 | C4 |
| NR (1) | 100 | 100 | 100 | 100 | 100 | 100 | 100 | 100 | 100 | 100 | 100 |
| including NR originating from a PMMA-grafted NR (2) | — | 12 | — | 23 | — | — | 47 | — | 100 | — | — |
| Corresponding PMMA content | — | 5 | — | 10 | — | — | 20 | — | 30 | — | — |
| PMMA 1 (3) | — | — | — | — | 10 | — | — | — | — | 30 | — |
| PMMA 2 (4) | — | — | 5 | — | — | 10 | — | 20 | — | — | 30 |
| Carbon black (5) | 54 | 54 | 54 | 54 | 54 | 54 | 54 | 54 | 54 | 54 | 54 |
| ZnO (6) | 2.4 | 2.4 | 2.4 | 2.4 | 2.4 | 2.4 | 2.4 | 2.4 | 2.4 | 2.4 | 2.4 |
| Stearic acid (7) | 2 | 2 | 2 | 2 | 2 | 2 | 2 | 2 | 2 | 2 | 2 |
| Sulphur | 1.1 | 1.1 | 1.1 | 1.1 | 1.1 | 1.1 | 1.1 | 1.1 | 1.1 | 1.1 | 1.1 |
| Accelerator (8) | 1.1 | 1.1 | 1.1 | 1.1 | 1.1 | 1.1 | 1.1 | 1.1 | 1.1 | 1.1 | 1.1 |
| Antioxidant (9) | 2 | 2 | 2 | 2 | 2 | 2 | 2 | 2 | 2 | 2 | 2 |

(1) Natural rubber
(2) PMMA-grafted natural rubber comprising 30% of PMMA, Megapoly 30 from Akrochem
(3) Polymethyl methacrylate, Delpet 80NB from Asahi Kasei, Vicat Point VP = 104° C.
(4) Polymethyl methacrylate, Delpet SR 6500 from Asahi Kasei, Vicat Point VP = 78° C.
(5) ASTM grade N234 (Cabot)
(6) Zinc oxide, industrial grade—Umicore
(7) Stearin, Pristerene 4931 from Uniqema
(8) N-Cyclohexyl-2-benzothiazolesulphenamide (Santocure CBS from Flexsys)
(9) N-(1,3-Dimethylbutyl)-N'-phenyl-p-phenylenediamine (Santoflex 6-PPD) from Flexsys and antiozone wax

TABLE 2

|  | T1 | T2 | C1 | T3 | T4 | C2 | T5 | C3 | T6 | T7 | C4 |
| --- | --- | --- | --- | --- | --- | --- | --- | --- | --- | --- | --- |
| G*60° C. | 1.5 | 1.6 | 1.5 | 1.9 | 4.7 | 1.6 | 2.7 | 2 | 4.4 | 8 | 2.7 |
| tan(delta)$_{max}$ 60° C. | 0.24 | 0.27 | 0.25 | 0.28 | 0.31 | 0.26 | 0.29 | 0.27 | 0.30 | 0.43 | 0.29 |
| $\mu$ at 20° C. | 0.40 | 0.42 | 0.43 | 0.45 | 0.40 | 0.46 | 0.44 | 0.45 | 0.43 | 0.35 | 0.44 |
| Grip performance base 100 | 100 | 105 | 107 | 112 | 100 | 115 | 110 | 112 | 107 | 87 | 110 |

In comparison with the control compositions, it is noted that the compositions in accordance with the invention exhibit the best compromise between a much improved grip performance and a stability of the hysteresis and of the stiffness. These results show that the compositions of the invention make possible good categories of performance with regard to the essential aspects, which are the grip, the rolling resistance and the road behaviour. None of the control compositions make possible as good a compromise in all these categories of performance simultaneously. It is also noted that the use of a PMMA resin exhibiting a Vicat point of greater than 100° C. does not make it possible to improve the grip of the compositions and, furthermore, increases the stiffness in a proportion too great for use in a tyre tread. It is also noted that the PMMA-grafted elastomer does not make possible as good a compromise as the invention, in particular between the grip and the hysteresis of the composition.

A second series of examples is presented in Table 3, the object of which is to compare the different rubber properties of control compositions (T1 and T8 to T10) with compositions C5 and C6 in accordance with the invention. The measurement results for the properties measured are presented in Table 4.

TABLE 3

|  | Composition | | | | | |
| --- | --- | --- | --- | --- | --- | --- |
|  | T1 | T8 | T9 | C5 | T10 | C6 |
| NR (1) | 100 | 100 | 100 | 100 | 100 | 100 |
| including NR originating from a PMMA-grafted NR (2) | — | — | 100 | — | 100 | — |
| Corresponding PMMA content | — | — | 30 | — | 30 | — |
| PMMA 2 (3) | — | — | — | 30 | — | 30 |
| Carbon black (4) | 54 | 68 | 14 | 20 | 54 | 54 |
| Oil (5) | — | — | — | — | 53 | 48 |
| ZnO (6) | 2.4 | 2.4 | 2.4 | 2.4 | 2.4 | 2.4 |
| Stearic acid (7) | 2 | 2 | 2 | 2 | 2 | 2 |
| Sulphur | 1.1 | 1.1 | 1.1 | 1.1 | 1.1 | 1.1 |
| Accelerator (8) | 1.1 | 1.1 | 1.1 | 1.1 | 1.1 | 1.1 |
| Antioxidant (9) | 2 | 2 | 2 | 2 | 2 | 2 |

(1) Natural rubber
(2) PMMA-grafted natural rubber comprising 30% of PMMA, Megapoly 30 from Akrochem
(3) Polymethyl methacrylate, Delpet SR 6500 from Asahi Kasei, Vicat Point VP = 78° C.
(4) ASTM grade N234 (Cabot)
(5) MES oil, Catenex SNR from Shell
(6) Zinc oxide, industrial grade—Umicore
(7) Stearin, Pristerene 4931 from Uniqema
(8) N-Cyclohexyl-2-benzothiazolesulphenamide (Santocure CBS from Flexsys)
(9) N-(1,3-Dimethylbutyl)-N'-phenyl-p-phenylenediamine (Santoflex 6-PPD from Flexsys and antiozone wax

TABLE 4

|  | T1 | T8 | T9 | C5 | T10 | C6 |
| --- | --- | --- | --- | --- | --- | --- |
| G*60° C. | 1.5 | 2.1 | 2.1 | 2 | 1.5 | 1.5 |
| tan(delta)max 60° C. | 0.24 | 0.30 | 0.16 | 0.14 | 0.35 | 0.33 |
| µ at 20° C. | 0.40 | 0.38 | 0.49 | 0.51 | 0.48 | 0.50 |
| Grip performance base 100 | 100 | 95 | 122 | 127 | 120 | 125 |

In comparison with the control compositions, it is noted that the compositions in accordance with the invention make it possible, still with excellent grip and stiffness categories of performance, to substantially lower the hysteresis of the compositions while lowering the content of reinforcing filler, without damaging the other properties. The compositions in accordance with the invention exhibit the best compromise between a much improved grip performance and a stability of or improvement in the hysteresis and the stiffness. These results show that the compositions of the invention make possible good categories of performance with regard to the essential aspects, which are the grip, the rolling resistance and the road behaviour. It is also noted that the PMMA-grafted elastomer does not make possible as good a compromise as the invention, in particular between the grip and the hysteresis of the composition.

The invention claimed is:

1. A tire provided with a tread comprising a rubber composition based on at least one diene elastomer, a reinforcing filler, a crosslinking system and a polymethyl methacrylate thermoplastic resin, the polymethyl methacrylate thermoplastic resin exhibiting a Vicat softening point, measured according to Standard ISO 306: 2013 B50, within a range extending from 60° C. to 100° C.

2. The tire according to claim 1, wherein the diene elastomer is selected from the group consisting of polybutadienes, synthetic polyisoprenes, natural rubber, butadiene copolymers, isoprene copolymers and mixtures thereof.

3. The tire according to claim 1, wherein the diene elastomer is selected from the group consisting of polybutadienes, copolymers of butadiene and styrene, natural rubber and mixtures thereof.

4. The tire according to claim 1, wherein the reinforcing filler is selected from the group consisting of silicas, carbon blacks and mixtures thereof.

5. The tire according to claim 1, wherein a content of reinforcing filler is within a range extending from 10 to 200 phr.

6. The tire according to claim 5, wherein the content of reinforcing filler is within a range extending from 10 to 150 phr.

7. The tire according to claim 1, wherein the predominant reinforcing filler is carbon black.

8. The tire according to claim 7, wherein a content of carbon black is within a range extending from 10 to 90 phr.

9. The tire according to claim 8, wherein the content of carbon black is within a range extending from 10 to 70 phr.

10. The tire according to claim 1, wherein the predominant reinforcing filler is silica.

11. The tire according to claim 10, wherein a content of silica is within a range extending from 50 to 140 phr.

12. The tire according to claim 11, wherein the content of silica is within a range extending from 70 to 120 phr.

13. The tire according to claim 1, wherein a content of polymethyl methacrylate thermoplastic resin is within a range extending from 1 to 40 phr.

14. The tire according to claim 13, wherein the content of polymethyl methacrylate thermoplastic resin is within a range extending from 2 to 35 phr.

15. The tire according to claim 14, wherein the content of polymethyl methacrylate thermoplastic resin is within a range extending from 3 to 30 phr.

16. The tire according to claim 15, wherein the content of polymethyl methacrylate thermoplastic resin is within a range extending from 5 to 15 phr.

17. The tire according to claim 1, wherein the Vicat softening point of the polymethyl methacrylate thermoplastic resin is within a range extending from 65° C. to 95° C.

18. The tire according to claim 17, wherein the Vicat softening point of the polymethyl methacrylate thermoplastic resin is within a range extending from 70° C. to 90° C.

19. The tire according to claim 1, wherein the rubber composition additionally comprises a plasticizer.

20. The tire according to claim 19, wherein the plasticizer is selected from the group consisting of oils, hydrocarbon resins and mixtures thereof.

21. The tire according to claim 19, wherein a content of plasticizer is within a range extending from 2 to 80 phr.

22. The tire according to claim 21, wherein the content of plasticizer is within a range extending from 5 to 60 phr.

23. The tire according to claim 1, wherein the rubber composition does not comprise a plasticizing agent other than the polymethyl methacrylate thermoplastic resin.

* * * * *